(12) United States Patent
Preining et al.

(10) Patent No.: US 9,194,446 B2
(45) Date of Patent: Nov. 24, 2015

(54) CRANK SET FOR A MOTORIZED BICYCLE

(75) Inventors: Daniel Preining, Salzburg (AT); Matthias Eitschberger, Marbach (DE)

(73) Assignee: EGO SPORTS GMBH, Eugendorf (AT)

( * ) Notice: Subject to any disclaimer, the term of this patent is extended or adjusted under 35 U.S.C. 154(b) by 83 days.

(21) Appl. No.: 13/818,715

(22) PCT Filed: Jul. 20, 2011

(86) PCT No.: PCT/EP2011/003637
§ 371 (c)(1), (2), (4) Date: Feb. 25, 2013

(87) PCT Pub. No.: WO2012/028226
PCT Pub. Date: Mar. 8, 2012

(65) Prior Publication Data
US 2013/0150194 A1    Jun. 13, 2013

(30) Foreign Application Priority Data
Aug. 31, 2010  (AT) ................. GM538/2010

(51) Int. Cl.
  *F16D 41/24*  (2006.01)
  *B62M 6/55*  (2010.01)
  *B62M 9/10*  (2006.01)
  *B62M 6/40*  (2010.01)

(52) U.S. Cl.
  CPC ............... *F16D 41/24* (2013.01); *B62M 6/40* (2013.01); *B62M 6/55* (2013.01); *B62M 9/105* (2013.01)

(58) Field of Classification Search
  USPC .................... 280/259; 180/206.4; 192/64
  See application file for complete search history.

(56) References Cited

U.S. PATENT DOCUMENTS

| | | | | |
|---|---|---|---|---|
| 4,144,773 | A | * | 3/1979 | Addicks .................. 474/161 |
| 5,213,550 | A | * | 5/1993 | Wu ........................ 474/160 |
| 5,314,366 | A | * | 5/1994 | Palm ....................... 474/152 |
| D356,526 | S | * | 3/1995 | Burns ..................... D12/123 |
| 5,426,997 | A | | 6/1995 | Brion |
| 5,766,106 | A | * | 6/1998 | Edwards ................. 474/160 |
| 6,024,662 | A | * | 2/2000 | Fujimoto ................ 474/144 |
| 6,352,131 | B1 | | 3/2002 | Lin et al. |
| 8,256,554 | B2 | * | 9/2012 | Chan ...................... 180/206.4 |
| 2006/0094550 | A1 | * | 5/2006 | Tetsuka ................... 474/160 |
| 2008/0207369 | A1 | * | 8/2008 | Bouchez ................. 474/160 |
| 2009/0098966 | A1 | * | 4/2009 | Kamada ................. 474/160 |

FOREIGN PATENT DOCUMENTS

| | | |
|---|---|---|
| DE | 892561 C | 10/1953 |
| EP | 1462355 A1 | 9/2004 |
| FR | 2921630 A1 | 4/2009 |

(Continued)

OTHER PUBLICATIONS

European Patent Office, International Search Report in International Patent Application No. PCT/EP2011/003637 (Oct. 31, 2011).

(Continued)

*Primary Examiner* — Kevin Hurley
(74) *Attorney, Agent, or Firm* — Leydig, Voit & Mayer, Ltd.

(57) ABSTRACT

A crank set for a bicycle includes a free-wheeling device having holes for attaching chain rings. The holes include two separate circular bolt hole patterns L1 and L2.

13 Claims, 2 Drawing Sheets

(56) References Cited

FOREIGN PATENT DOCUMENTS

| | | | |
|---|---|---|---|
| GB | 2440132 | A | 1/2008 |
| WO | 2008038213 | A2 | 4/2008 |

OTHER PUBLICATIONS

Austrian Patent Office, Search Report in Patent Application No. GM 238/2010 (Dec. 17, 2010).

* cited by examiner

CRANK SET FOR A MOTORIZED BICYCLE

CROSS REFERENCE TO RELATED APPLICATIONS

This application is a U.S. National Phase application under 35 U.S.C. §371 of International Application No. PCT/EP2011/003637, filed on Jul. 20, 2011, and claims benefit to Austrian Patent Application No. GM 538/2010, filed on Aug. 31, 2010. The International Application was published in German on Mar. 8, 2012 as WO 2012/028226 A1 under PCT Article 21 (2).

FIELD

This invention concerns a crank set which can be used on motorized bicycles, especially electrically motorized bicycles.

BACKGROUND

Given the current state of technology, these types of crank sets cannot be flexibly utilized and are difficult to mount. The purpose of this invention is to improve the shortcomings of the current state of technology.

SUMMARY

In an embodiment, the present invention provides a crank set for a bicycle includes a free-wheeling device having holes for attaching chain rings. The holes include two separate circular bolt hole patterns L1 and L2.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
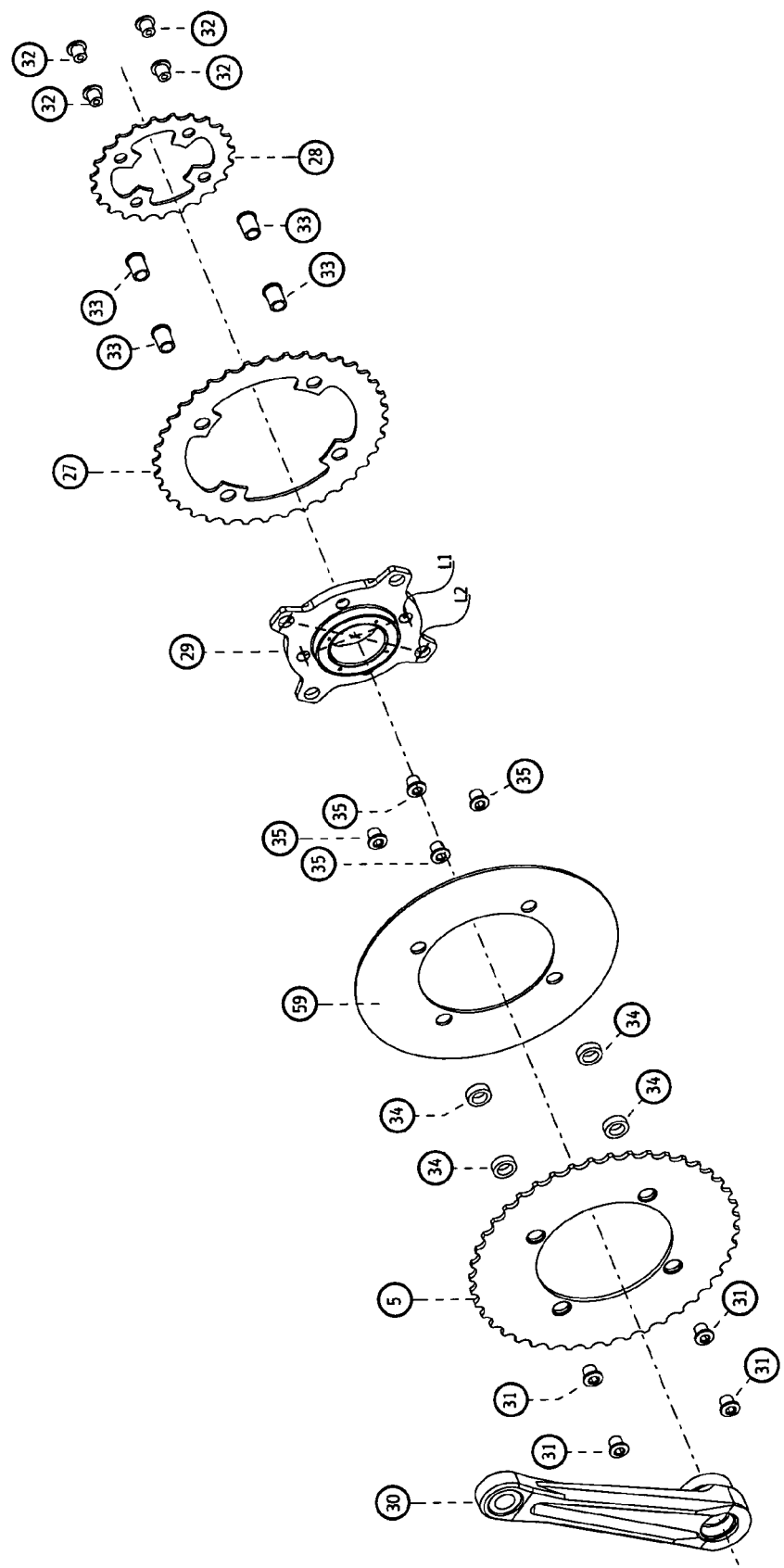
FIG. 1 shows a crank set according to an embodiment of the invention with at least a free-wheeling device being a part of this crank set

In an embodiment, the present invention provides a crank set for a bicycle, with the crank set being designed with a free-wheeling device (25, 26, 29) with holes to facilitate the attachment of chain rings (5, 27, 28), with the holes being arranged in a circular pattern in accordance with two individual bolt hole circles L1 and L2.

Utilizing the free-wheeling device according to the invention, a number of chain rings can be mounted and, through a free-wheel assembly, separated from the crankarm. Chain rings of various sizes can thus be easily mounted, or, alternatively, the existing chain rings of the bicycle—including the existing gear shift mechanism—can be utilized if the bicycle is retrofitted with an electric motor, so that one of these chain rings is powered by a motor by means of a separate chain.

Standard chain rings generally feature different bolt hole circles, so that the free-wheeling device according to invention is compatible with chain rings currently on the market, as opposed to the necessity for specially manufactured chain rings with the current state of technology. The free-wheeling device can thus be used flexibly in conjunction with the many chain rings available on the market today.

The free-wheeling device allows for the unidirectional rotation of two counter-rotatable components of the free-wheel assembly. One of the rotatable components is fitted with a crankarm, while the other rotatable component can be fitted with a minimum of one chain gear. The free-wheeling device supports a mode of operation in which the bicycle can be ridden without pedaling, but solely on motor power.

Each bolt hole pattern of the free-wheeling device features at least three, preferably four, five or more holes.

In another design example of this invention, the bolt hole patterns L1 and L2 feature the same diameter as the bolt hole patterns of the mountable chain rings (5, 27, 28.)

L1 preferably is the diameter of the bolt hole pattern for a small chain ring, with preferably 20 to 24, ideally 22 teeth. L1 preferably measures between 50 and 80 mm, preferably 58 mm, ideally 64 mm.

L2 preferably is the diameter of the bolt pattern of a medium (30 to 38 teeth) to large size (more than 38 teeth) chain ring. L2 preferably measures between 90 and 146 mm, ideally 104 mm.

The bolt patterns L1 and L2 will preferably have the same number of holes as the bolt hole patterns of the mountable chain rings.

In another design example of this invention, the free-wheeling device (25, 26) features a chain ring adapter (25) and a free-wheel assembly (26) which can be bolted together by means of bolts (35.)

The chain ring adapter is preferably a circular disk, preferably recessed on the inside, with a primary ring of at least three, preferably four, five, or more holes intended for mounting the free-wheel assembly and preferably a small chain ring. The holes are preferably arranged in accordance with bolt hole pattern diameter L1. The secondary ring on the chain ring adapter features at least three, preferably four or more holes preferably arranged in accordance with bolt hole pattern diameter L2 intended for the mounting of cogs.

The holes of the secondary ring are preferably arranged in the recessed portions of the chain ring adapter. The chain ring adapter can preferably be fitted with chain rings measuring 104 mm in diameter (e.g. 32 to 46 teeth) as well as chain rings with 20 to 24 (e.g. 22 teeth) and a small bolt hole pattern (58 mm, 64 mm.)

The free-wheel assembly preferably features a ring with three, preferably four or more holes for mounting the chain ring adapter, with the holes preferably being arranged in accordance with bolt hole pattern diameter L1.

The chain ring adapter also allows for low-cost production. The free-wheel assembly is preferably made of stainless steel, despite it being more expensive to manufacture and heavier than aluminum, due to the great forces exerted on it. Because of the adapter, the adapter itself as well as the chain rings can be manufactured from less expensive and lighter materials, such as aluminum. Construction of a free-wheel assembly with integrated chain ring adapter requires more of more expensive materials, which is magnified by added waste during the manufacturing process. Thus this solution results in higher flexibility, lower weight, and lower production costs.

In another design example of this invention, the free-wheel assembly (26) features holes arranged in accordance with at least one circular bolt hole pattern L3, with the bolt hole pattern L3 preferably featuring the same diameter as either one of bolt hole patterns L1 or L2.

This way, the same bolts can be utilized to attach the free-wheel assembly as well as at least one chain ring with the bolt hole pattern diameter L3 to the chain ring adapter, so that the number of bolts necessary for mounting can be kept to a minimum.

In another design example of this invention, one of the mountable chain rings (5, 27, 28) is designed to be utilized in conjunction with a motor (motorized chain ring) (5), while the drivetrain features a chain guide plate (59) mountable between the motorized chain ring (5) and the other chain rings (27, 28.)

The chain guide plate preferably features a larger diameter than the chain rings utilized. The plate prevents the chain to the rear wheel from jumping to the motorized chain ring, as well as the chain to the motor from jumping to one of the chain rings used for the chain to the rear wheel. It prevents both chains or drive belts from coming off.

The motorized chain ring is preferably used to run a chain to an electric motor, while the other chain rings are used to run a chain to the rear wheel.

In another design example of this invention, the free-wheeling device (25, 26, 29) features an axial opening with an internal thread to which a crankarm (30) featuring an external thread can be bolted. This allows for quickly mounting a crankarm to the free-wheeling device.

FIG. 1 shows a crank set according to the invention, with at least free-wheeling device 29 being part of this crank set. Free-wheeling device 29 features a circular inner bolt hole pattern with four (preferably three to five) holes and a bolt hole pattern diameter L1 of 58 mm or 64 mm. At least one primary chain ring 27 with 36 (preferably 30 to 48) teeth and corresponding circular bolt hole pattern with a diameter L2 can be attached using the four (preferably three to five) outside holes arranged in a circular pattern (diameter of the ring or bolt pattern L2=104 mm) of the free-wheeling device 29 and the threaded sleeves 33 and bolts 31. Furthermore, a secondary chain ring 28 with 22 (preferably 20 to 28) teeth and a corresponding—but compared to chain ring 27's bolt pattern—smaller diameter L1 can be mounted using the inside circular bolt hole pattern and bolts 32 and 35. The motorized chain ring 5 can be mounted to the chain ring adapter 29 with a chain guide plate 59 in between using bolts 31 and spacers 34. Crankarm 30 is bolted into the free-wheeling device 29 using the outside thread on crankarm 30 and the inner thread on the free-wheeling device 29.

Using the free-wheeling device 29, existing chain rings can continue to be utilized and expanded with the motorized chain ring 5, with the chain guide plate 59 to be added between the two components. The free-wheeling device 29 makes the different modes of operation of the electric bicycle possible. The existing gears of the bicycle can continue to be used as designed.

Figure 2:
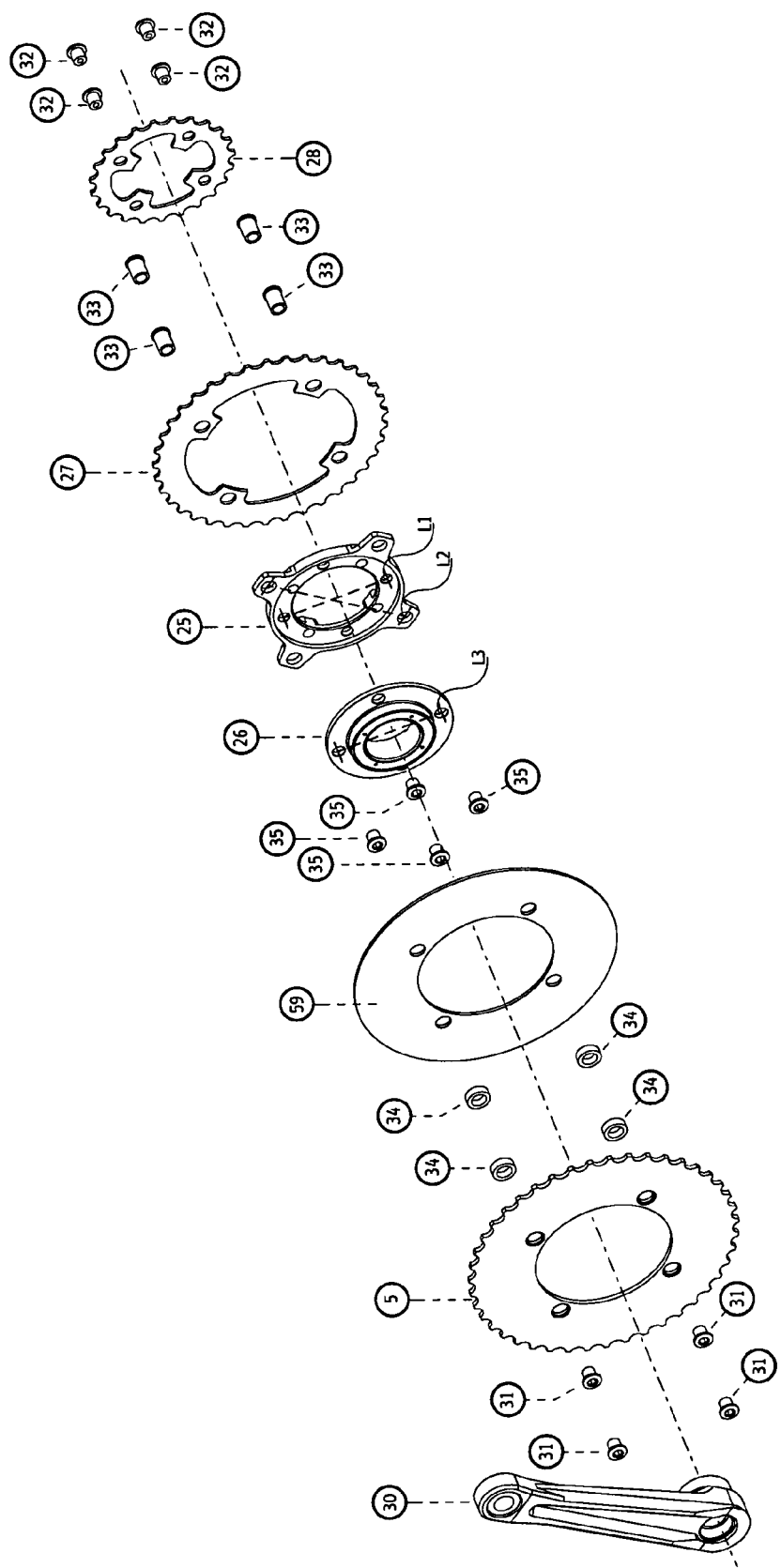
FIG. 2 shows an additional crank set according to an embodiment of the invention with a free-wheeling device including a free-wheel assembly and a chain ring adapter.

FIG. 2 shows an additional crank set according to the invention. In this example, the free-wheeling device 25, 26 consists of a free-wheeling assembly 26 and a chain ring adapter 25. The chain ring adapter 25, just like the free-wheeling device in FIG. 1, features an inner circular bolt hole pattern with a diameter of L1, with the free-wheel assembly 26 with its four (preferably three to five) holes arranged according to the circular bolt hole ring pattern L3—which preferably equals L1—being attachable to these bolt holes using bolts 35. Just like the free-wheeling device 29 from FIG. 1, the chain ring adapter 25 features an outside circular bolt hole pattern with a diameter of L2, to which larger chain rings can be attached.

The free-wheeling assembly 26 and chain ring adapter 25 can be manufactured from different materials, due to the use of the chain ring adapter 25 with an attachable free-wheeling assembly 26 instead of an integrated free-wheeling device 29.

The chain ring adapter 25 consists of aluminum, whereas the free-wheel assembly 26 is made of stainless steel, due to the inherent necessity to be made of more stress-resilient material. The necessary amount of heavy and expensive stainless steel required is thus reduced, which results in weight and cost optimization. Additionally, since the free-wheeling device is split into the free-wheel assembly 26 and chain ring adapter 25, the amount of waste produced in the manufacturing process of the individual parts is reduced.

This invention makes it possible to easily attach chain rings with various bolt hole patterns, as they are currently produced by the bicycle industry, to a free-wheeling device by means of bolts. This way the already existing chain rings of a bicycle can be utilized. While large chain rings can for example be bolted to the holes that are arranged in bolt hole pattern L2, smaller chain rings can be bolted to the holes that are arranged in bolt hole pattern L1. In a preferred alternative, the free-wheeling device consists of a chain ring adapter and a free-wheel assembly. This way, weight and costs can be optimized, since the adapter and the free-wheel assembly can be manufactured separately using the most ideal materials in regards to costs, weight, and stability.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

REFERENCE SIGNS

5 Motorized Chain Ring
25 Chain Ring Adapter
26 Free-Wheel Assembly
27 Chain Ring
28 Chain Ring
29 Free-Wheel Assembly with Integrated Chain Ring Adapter
30 Crankarm
31 Bolt
32 Bolt
33 Threaded Sleeve
34 Spacer
35 Bolt
59 Chain Guide Plate

The invention claimed is:

1. A crank set for a bicycle comprising:
a free-wheeling device including holes for attaching chain rings, the holes including two separate circular bolt hole patterns L1 and L2,
wherein the free-wheeling device includes a chain ring adapter and a free-wheel assembly, which are bolted together using bolts.

2. The crank set according to claim 1, wherein the circular bolt hole patterns L1 and L2 each include a diameter that is the same as a circular bolt hole pattern of a corresponding attachable chain ring.

3. The crank set according to claim 2, wherein the free-wheeling device includes a chain ring adapter and a free-wheel assembly, which are bolted together using bolts.

4. The crank set according to claim 2, further comprising an attachable motorized chain ring and wherein the crank set includes a chain guide plate mountable between the motorized chain ring and additional chain rings.

5. The crank set according to claim 1, wherein the holes of the free-wheel assembly includes at least one additional circular bolt hole pattern L3, the at least one additional circular bolt hole pattern L3 having the same diameter as one of circular bolt hole pattern L1 or L2.

6. The crank set according to claim 5, further comprising an attachable motorized chain ring and wherein the crank set includes a chain guide plate mountable between the motorized chain ring and additional chain rings.

7. The crank set according to claim 5, wherein the free-wheeling device includes an axial opening with an inner thread, and with a crankarm having an axial outside thread that is boltable into the axial opening.

8. The crank set according to claim 1, further comprising an attachable motorized chain ring and wherein the crank set includes a chain guide plate mountable between the motorized chain ring and additional chain rings.

9. The crank set according to claim 2, wherein the free-wheeling device includes an axial opening with an inner thread, and with a crankarm having an axial outside thread that is boltable into the axial opening.

10. The crank set according to claim 1, wherein the free-wheeling device includes an axial opening with an inner thread, and with a crankarm having an axial outside thread that is boltable into the axial opening.

11. A crank set for a bicycle comprising:
a free-wheeling device including holes for attaching chain rings, the holes including two separate circular bolt hole patterns L1 and L2; and
an attachable motorized chain ring and wherein the crank set includes a chain guide plate mountable between the motorized chain ring and additional chain rings.

12. The crank set according to claim 11, wherein the free-wheeling device includes an axial opening with an inner thread, and with a crankarm having an axial outside thread that is boltable into the axial opening.

13. A crank set for a bicycle comprising:
a free-wheeling device including holes for attaching chain rings, the holes including two separate circular bolt hole patterns L1 and L2,
wherein the free-wheeling device includes an axial opening with an inner thread, and with a crankarm having an axial outside thread that is boltable into the axial opening.

* * * * *